(12) United States Patent
Chen

(10) Patent No.: US 6,637,935 B2
(45) Date of Patent: Oct. 28, 2003

(54) STRUCTURE OF A CLINICAL THERMOMETER

(76) Inventor: Min-Ying Chen, 10 Fl., No. 43, Kuang Ming Six Rd., Chu Pei Hsien (TW)

( * ) Notice: Subject to any disclaimer, the term of this patent is extended or adjusted under 35 U.S.C. 154(b) by 0 days.

(21) Appl. No.: 10/038,606

(22) Filed: Jan. 8, 2002

(65) Prior Publication Data

US 2003/0128738 A1 Jul. 10, 2003

(51) Int. Cl.[7] .......................... G01K 1/16; G01K 7/00; A61B 5/00
(52) U.S. Cl. ...................... 374/185; 374/208; 600/549
(58) Field of Search ................................ 374/163, 208, 374/194, 170, 169, 185, 184; 600/549

(56) References Cited

U.S. PATENT DOCUMENTS

| | | | | |
|---|---|---|---|---|
| 4,453,835 A | * | 6/1984 | Clawson et al. | 374/185 |
| 4,556,837 A | * | 12/1985 | Kobayashi et al. | 320/2 |
| 4,729,672 A | * | 3/1988 | Takagi | 374/208 |
| 4,743,121 A | * | 5/1988 | Takagi et al. | 374/163 |
| 4,929,092 A | * | 5/1990 | Taguchi et al. | 374/183 |
| 5,013,161 A | * | 5/1991 | Zaragoza et al. | 374/208 |
| 5,165,798 A | * | 11/1992 | Watanabe | 374/208 |
| 6,068,399 A | * | 5/2000 | Tseng | 374/163 |
| 6,101,094 A | * | 8/2000 | Kermaani et al. | 361/720 |
| 6,379,039 B1 | * | 4/2002 | Tseng | 374/163 |
| 6,419,388 B2 | * | 7/2002 | Lee | 374/208 |
| 6,462,640 B2 | * | 10/2002 | Muziol | 338/28 |

FOREIGN PATENT DOCUMENTS

| | | | | |
|---|---|---|---|---|
| EP | 0410186 A1 | * | 7/1990 | G01K/7/00 |
| JP | 07027626 A | * | 1/1995 | G01K/7/00 |
| JP | 10221177 A | * | 8/1998 | G01K/7/00 |

* cited by examiner

Primary Examiner—Christopher W. Fulton
Assistant Examiner—G. Verbitsky
(74) Attorney, Agent, or Firm—Leong C. Lei

(57) ABSTRACT

An improved structure of a clinical thermometer in which a dielectric (such as air or heat conductive, hard or soft foam with a low conductivity coefficient) is packed into the metal tip section of its measuring extremity such that the inductive component and the inductor wire disposed in the metal tip section are in a helical arrangement and entirely attached to the inner wall of the metal tip section, allowing inducted temperature to attain heat equilibrium as well as swift heat conduction, thereby enabling the clinical thermometer to immediately indicate the precise temperature. The clinical thermometer body is of one-piece molded construction and, furthermore, a pliable section having exceptional dustproof and waterproof properties is sleeved over the depressible flat element of its on-off switch. Slanted surfaces of mutual contact and conjoinment are disposed at an appropriate area of the measuring extremity and a rotation structure consisting of a flange mount and insertion holes at the contact and conjoinment surfaces enable the rotation of the measuring extremity and its rotating to an appropriate angle. As such, when the user employs the clinical thermometer to measure temperature, the movable structure of the measuring extremity enables ergonomic and comfortable grasping and manual retention.

2 Claims, 7 Drawing Sheets

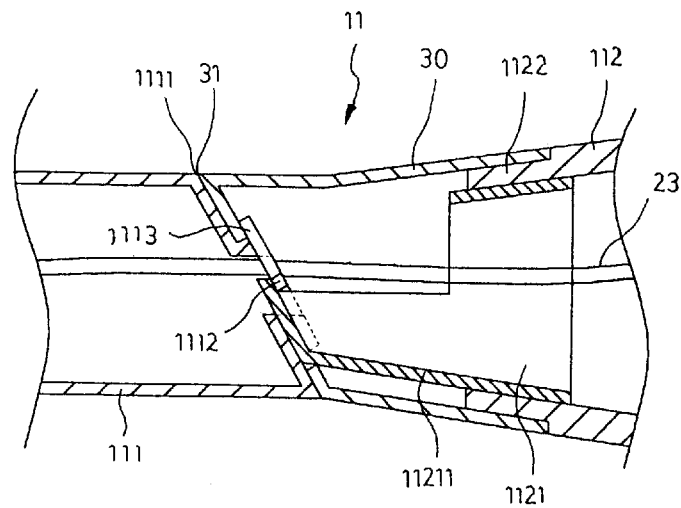 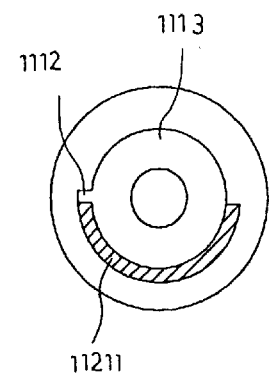
FIG. 6A
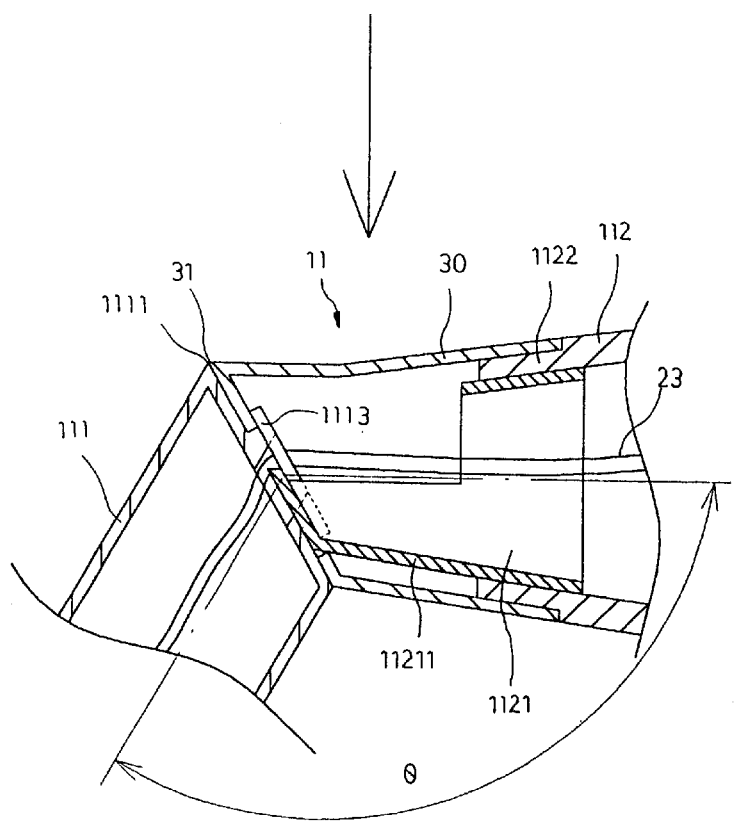 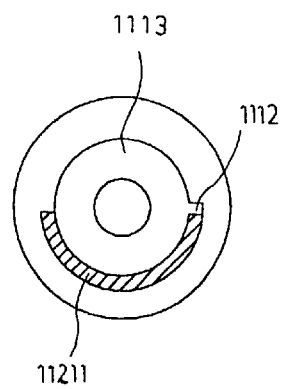
FIG. 6B
FIG. 6

STRUCTURE OF A CLINICAL THERMOMETER

BACKGROUND OF THE INVENTION

1) Field of the Invention

The invention herein relates to electronic thermometers, specifically an improved structure of a clinical thermometer.

2) Description of the Prior Art

Conventional electronic clinical thermometers generally have the following structural drawbacks:

(1) Referring to FIG. 7, a conventional electronic clinical thermometer 40 structure typically consists of a sleeve-type metal tip section 42 over its measuring extremity 41, an inductive component 43 and an inductor wire 44 disposed in the metal tip section 42, with the inducting of body temperature by the said inductive component 43 occurring such that the temperature is indicated on a display screen at the surface of the clinical thermometer 40; since one observes that solidified rubber 45 is contained in the metal tip section 42 to fix the inductive component 43 and, furthermore, conjoin the measuring extremity 41 to the metal tip section 42, although the metal tip section 42 is capable of conducting body heat when the metal tip section 42 contacts the epidermis, the poor heat conduction efficiency of the internal solidified rubber 45 makes it impossible for body heat to be equally and fully induced around the inductive component 43 disposed at the lower extent of the metal tip section 42 (because the inductive component 43 and the inductor wire 44 situated inside the metal tip section 42 do not contact the metal tip section 42) and, furthermore, based on Fourier's Law of thermodynamics (heat conduction speed is directly proportional to contact area), temperature inducted by the inductive component 43 and the inductor wire 44 cannot be rapidly heat conducted and cannot attain heat equilibrium, with the heat so inducted increasingly conveyed to the tip and dissipated; as such, the clinical thermometer 40 requires a longer time to measure body temperature and, furthermore, at an extreme degree of error (2) Conventional clinical thermometers 40 have a temperature display screen that is typically mounted in an opening provided for viewing the said display screen and since it is mounted a short distance away from a push-type power switch, waterproof and dustproof qualities are not optimal; furthermore, the display screen utilizes an extremely small alphanumeric character font and lacks an effective means of magnification.

(3) Conventional clinical thermometers 40 have a measuring extremity 41 of a gradually reduced diameter that tapers towards its most anterior end with a hard exterior surfacing for measuring under-arm or oral body temperature and, furthermore, the measuring extremity 41 cannot be articulated to an appropriate angle; as a result, when measuring under-arm temperature, the extremity is held within the armpit and maintained protruding from garments, requiring the user to squeeze the said clinical thermometer in place and which causes considerable user discomfort; some clinical thermometers now available have flexible measuring extremities, but since they automatically revert to their original shape, they cannot be positioned without manual intervention.

Since the said structural inadequacies of conventional clinical thermometers have not been refined into a more ideal arrangement, the inventor of the invention herein successfully designed an improved structure clinical thermometer that has undergone extensive application testing based on experience gained from years of engagement in product design and development.

SUMMARY OF THE INVENTION

The objective of the invention herein is to provide a clinical thermometer structure in which inducted temperature rapidly attains heat equilibrium and rapid heat conduction to immediately indicate accurate temperature. In the said structure, a dielectric (such as air or heat conductive, hard or soft foam with a low conductivity coefficient) is packed into the metal tip section of its measuring extremity such that the inductive component and the inductor wire disposed in the metal tip section are entirely attached to the inner wall of the metal tip section, allowing inducted temperature to attain heat equilibrium as well as the swift heat conduction, thereby enabling the clinical thermometer of the present invention to immediately indicate the precise temperature.

Another objective of the invention herein is to provide a clinical thermometer structure having superior dustproof and waterproof qualities. In the said structure, the clinical thermometer body is of one-piece molded construction and, furthermore, a pliable section having exceptional dustproof and waterproof properties is sleeved over the depressible flat element of its on-off switch.

Yet another objective of the invention herein is to provide a clinical thermometer structure in which the measuring extremity can be adjusted to an appropriate angle to facilitate utilization. In the said structure, slanted surfaces of mutual contact and conjoinment are disposed at an appropriate area of the measuring extremity and a rotation structure consisting of a flange mount and insertion holes at the contact and conjoinment surfaces enable the rotation of the measuring extremity and its rotating to an appropriate angle; as such, when the user employs the clinical thermometer to measure temperature, the movable structure of the measuring extremity enables ergonomic and comfortable grasping and manual retention.

BRIEF DESCRIPTION OF THE DRAWINGS

FIG. 6 is a cross-sectional drawing of the measuring extremity of the invention herein after rotation to an angle.

FIGS. 6A and 6B are end views FIG. 6.

DETAILED DESCRIPTION OF THE INVENTION

Figure 1:
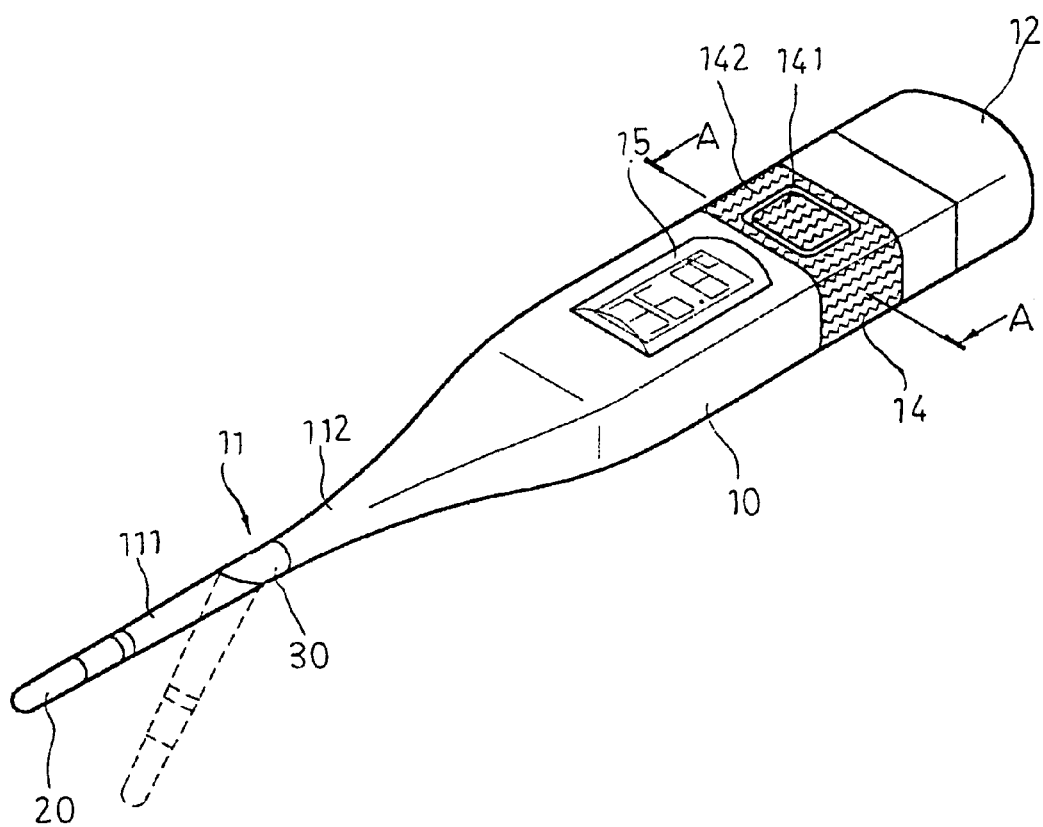
FIG. 1 is an isometric drawing of the invention herein.
Figure 2A:
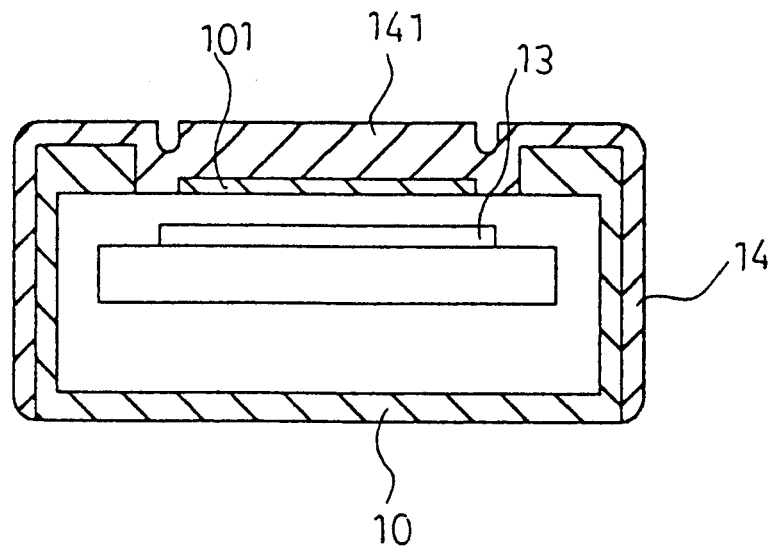
FIGS. 2A and 2B are cross-sectional drawings of the pliable section of the invention herein as viewed from a frontal and lateral perspective.
Figure 2B:
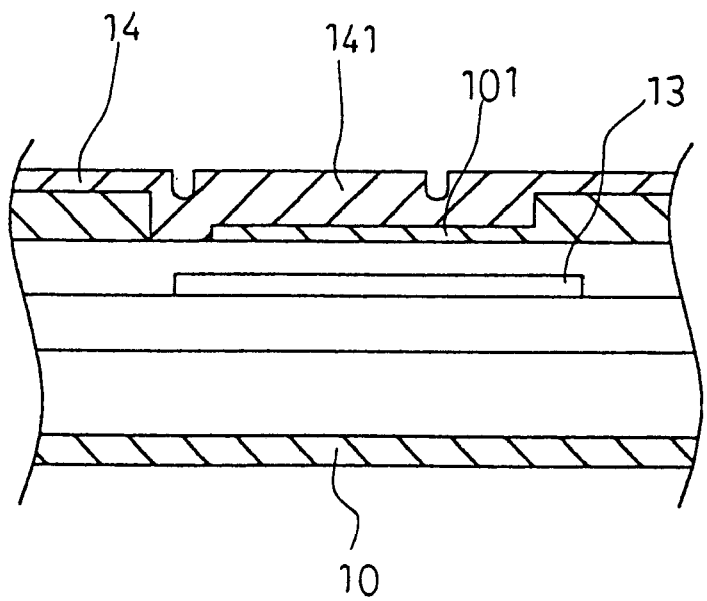

Referring to FIG. 1, FIGS. 2A and 2B, the structure of the invention herein is comprised of a clinical thermometer body 10, a measuring extremity 11 conjoined to the body 10, a metal tip section 20 sleeved onto the measuring extremity 11, and a rear cover 12 situated on the end of the body 10, wherein the clinical thermometer body 10 is of one-piece molded construction such that the entire body is both dustproof and waterproof. A U-shaped pliable section 14 is situated over a thermometer on-off switch 13 flat element 101 of the body 10, a push block 141 is disposed on the said pliable section 14 that provides for the pressing in and, furthermore, bending of the flat element 101 slightly downward such that the depressing the push block 141 actuates the on-off switch 13 to toggle on the circuit within the interior section of the clinical thermometer, while the space between the flat element 101 and the pliable section 14 is filled in to seal the on-off switch 13 such it is waterproof and dustproof, and the said pliable section 14 has a coarse pattern 142 on its surface to facilitate manual grasping. Furthermore, the body 10 has a one-piece convex bezel 15 mounted over its display screen that magnifies the measured temperature alphanumeric characters indicated by the thermometer to facilitate easy viewing by the user, the said body 10 is transparent where the convex bezel 15 is mounted, with the remaining portion of the body 10 sharing same color as its inner walls.

Figure 3:
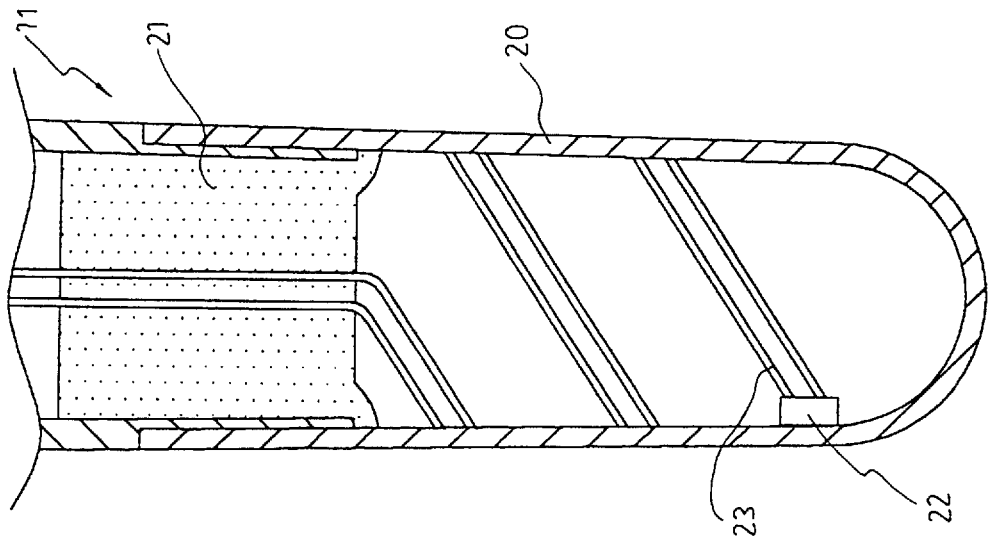
FIG. 3 is a cross-sectional drawing of the measuring extremity and metal tip section interior structure of the invention herein.

Referring to FIG. 3, hard rubber 21 is disposed at the conjoinment area between the metal tip section 20 of the invention herein and the clinical thermometer body 10 to reinforce and fix the inductor wire 23, and a dielectric (such as air or heat conductive, hard or soft foam with a low conductivity coefficient) is packed into the metal tip section 20 such that the inductive component 22 and the inductor wire 23 disposed in the metal tip section 20 are in a helical arrangement and entirely attached to the inner wall of the metal tip section 20, allowing inducted temperature to rapidly and fully attain equilibrium as well as the swift heat conduction in accordance with Fourier's Law of thermodynamics (heat conduction speed is directly proportional to contact area), thereby enabling the clinical thermometer of the present invention to immediately indicate the precise temperature.

Figure 4:
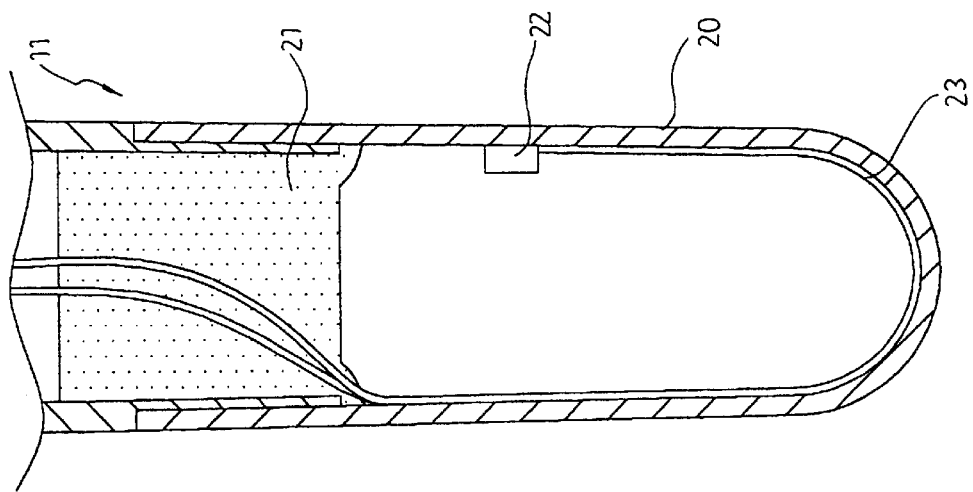
FIG. 4 is a cross-sectional drawing of another measuring extremity and metal tip section interior structure of the invention herein.
Figure 5:
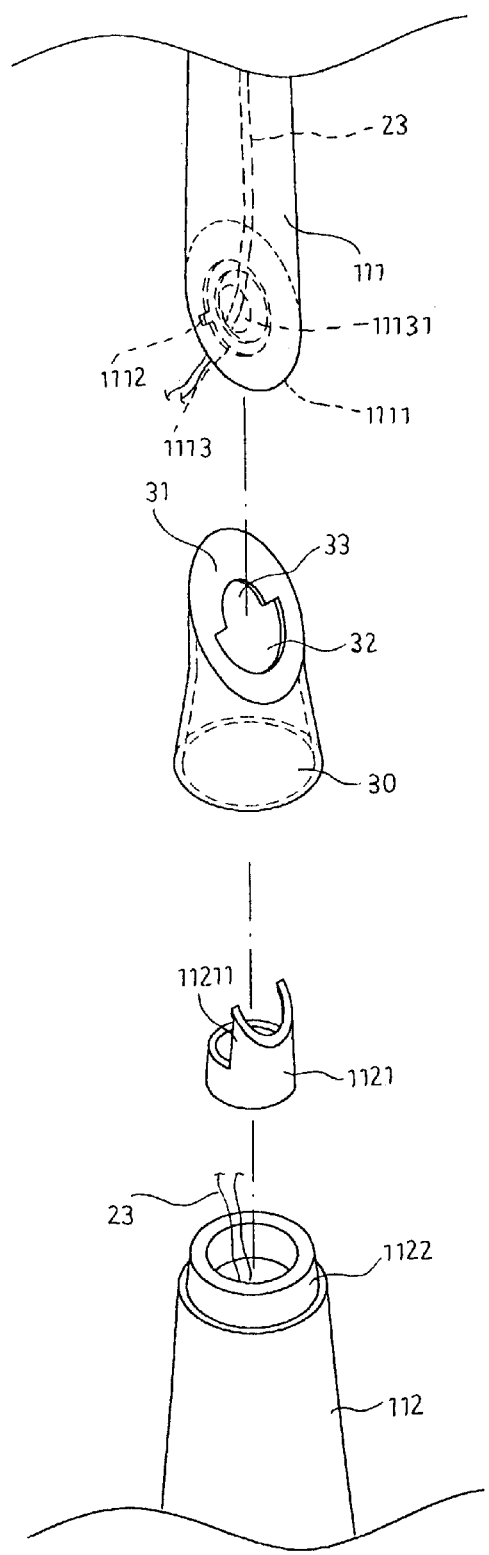
FIG. 5 is an exploded drawing of the measuring extremity rotation structure of the invention herein.
Figure 7:
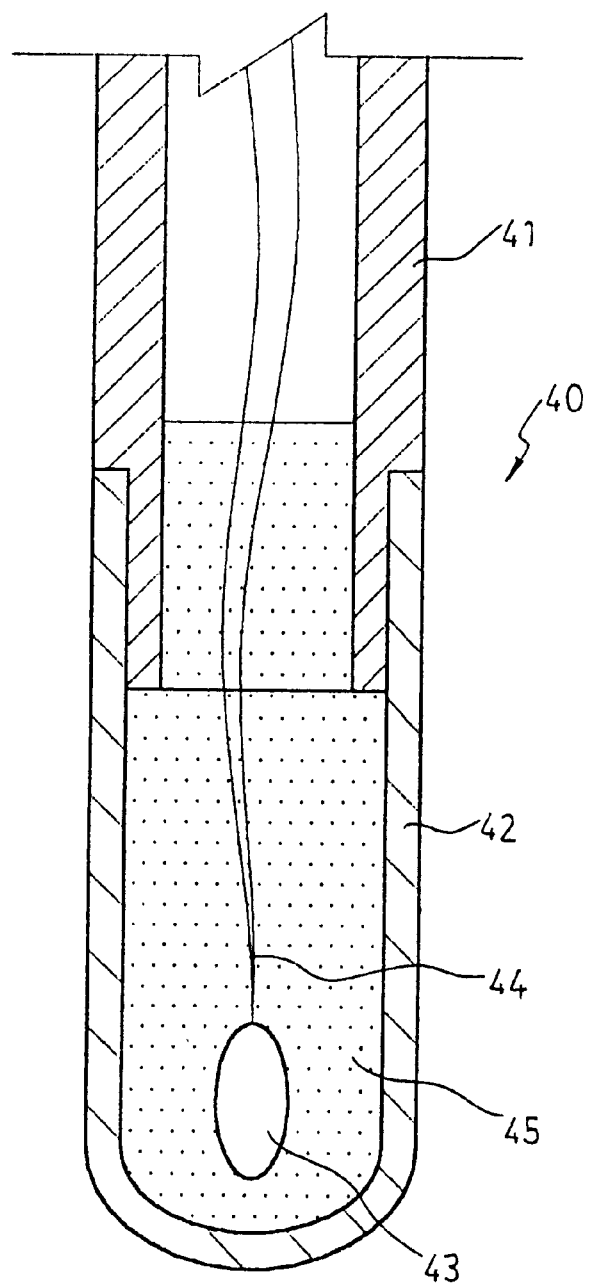
FIG. 7 is a cross-sectional drawing of the measuring extremity and metal tip interior structure of a conventional clinical thermometer.

Referring to FIG. 4, the inductive component 22 and the inductor wire 23 are not in a helical arrangement but likewise directly and entirely attached to the inner wall of the metal tip section 20 such that inducted temperature rapidly and fully attains heat equilibrium and swiftly becomes heat conductive.

Referring to FIG. 5 and FIGS. 6, 6A and 6B, the rotation structure of the measuring extremity 11 of the invention herein features a design in which the measuring extremity 11 consists of an anterior portion 111 and a base portion 112, each formed with a slanted surface of mutual contact and conjoinment; a flange mount 1113 having a lock rib 1112 is disposed on the slanted surface 1111 of the anterior portion 111 and a lock sleeve 1121 having a projecting engagement edge 11211 is situated inside the base portion 112; a stepped section 1122 is formed on the base portion 112 that provides for the fitting on of a hollow metal sleeve 30 such that the metal sleeve 30 is contained within the lock sleeve 1121; and the said metal sleeve 30 has a slanted surface 31, with a large insertion hole 32 merged to a small insertion hole 33 formed in the slanted surface 31.

When the said structure is assembled, the slanted surfaces 1111 and 31 are brought together and the flange mount 1113 is slipped into the large insertion hole 32 which also enables its sliding into the small insertion hole 33 and as such, the anterior portion 111 and the base portion 112 are in a conjoined arrangement capable of rotation; the front end of the lock sleeve 1121 engagement edge 11211 is against the anterior portion 111 slanted surface 1111 and, furthermore, extended into the smaller diameter root section of the flange mount 1113 and thus the large insertion hole 32 is retentionally occupied to prevent the separation of the anterior portion 111 from the base portion 112 during rotation; the lock rib 1112 is normally against one side of the engagement edge 11211 to provide static positioning support after the measuring extremity 11 is rotated; furthermore, the inductor wire 23 is inserted through a hole 11131 formed in the flange mount 1113 and extended into the clinical thermometer body 10.

When the measuring extremity 11 anterior portion 111 is rotated, the anterior portion 111 is rapidly postured due its slanted surface 1111 into an appropriate angle (the embodiments of the invention herein are capable of a 120-degree angle) at the base section 112 conjoinment point and, furthermore, since the flange mount 1113 lock rib 1112 are against the other side of the engagement edge 11211 following rotation, the rotated angle of the measuring extremity 11 is maintained in a fixed position; as such, when the user employs the clinical thermometer to measure temperature, the structure of the movable anterior portion 111 enables ergonomic and comfortable grasping and manual retention.

I claim:

1. A structure of a clinical thermometer comprised of a clinical thermometer body, a measuring extremity conjoined to said body, a metal tip section sleeved onto said measuring extremity having an inductive component and inductor wire disposed inside, and a rear cover situated on the end of said body, wherein said inductive component and said inductor wire disposed in said metal tip section are entirely attached to the inner wall of said metal tip section such that inducted temperature attains heat equilibrium and heat conduction, enabling the clinical thermometer to immediately indicate the temperature, wherein said measuring extremity has a rotation structure consisting of an anterior portion and a base portion, each formed with a slanted surface of mutual contact and conjoinment, and wherein a flange mount having a lock rib is disposed on the slanted surface of said anterior portion and a lock sleeve having a projecting engagement edge is situated inside said base portion; a stepped section is formed on said base portion that provides for the fitting on of a hollow metal sleeve such that said metal sleeve is contained within said lock sleeve; and said metal sleeve has a slanted surface, with a large insertion hole merged to a small insertion hole formed in said slanted surface; when said structure is assembled, said slanted surfaces of said anterior portion and said base portion are brought together and said flange mount is slipped into said large insertion hole which also enables its sliding into said small insertion hole such that said anterior portion and said base portion are in a conjoined arrangement capable of rotation; the front end of said lock sleeve engagement edge is against said anterior portion slanted surface and, furthermore, extended into the smaller diameter root section of said flange mount to prevent the separation of said anterior portion from said base portion during rotation.

2. The structure of a clinical thermometer as claimed in claim 1, wherein said flange mount has a hole formed in that provides for the insertion and extension of said inductor wire into said clinical thermometer body.

\* \* \* \* \*